July 7, 1964     S. J. KOCH ETAL     3,140,144
ELECTRICAL MEASURING AND RECORDING INSTRUMENTS
Filed Nov. 14, 1961     6 Sheets-Sheet 1

INVENTORS
SAMUEL J. KOCH
CHARLES EHRLICH
BY
ATTORNEY.

July 7, 1964 S. J. KOCH ETAL 3,140,144
ELECTRICAL MEASURING AND RECORDING INSTRUMENTS
Filed Nov. 14, 1961 6 Sheets-Sheet 2

INVENTORS
SAMUEL J. KOCH
CHARLES EHRLICH
BY
ATTORNEY.

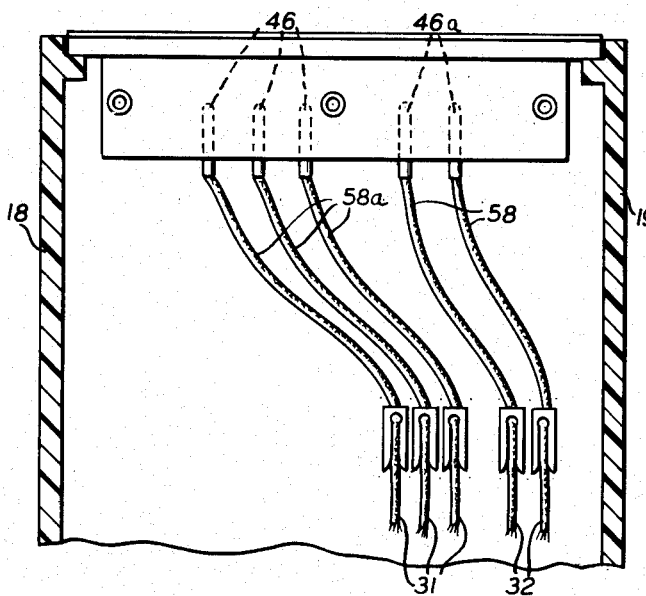
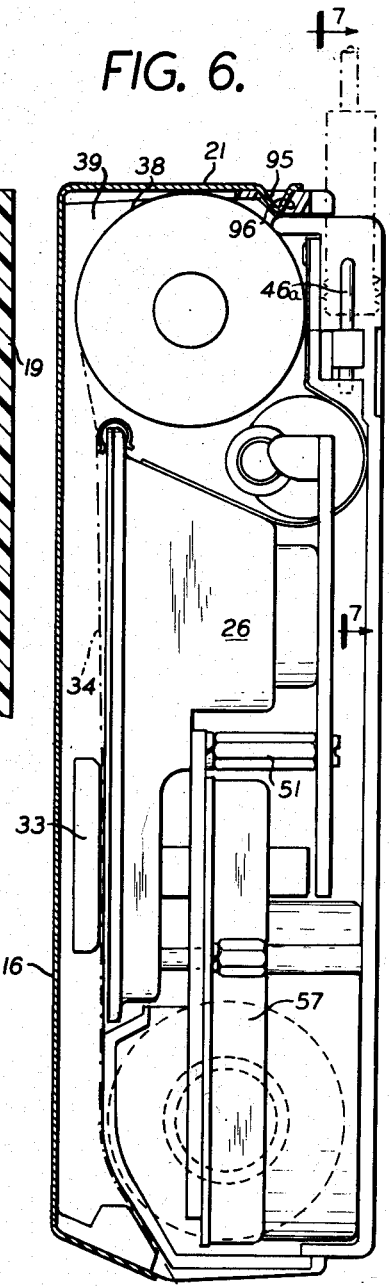
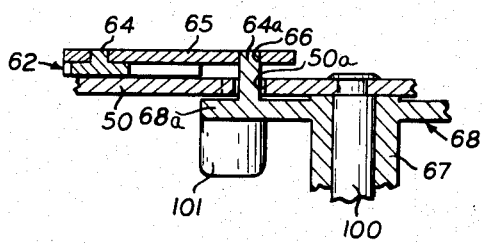
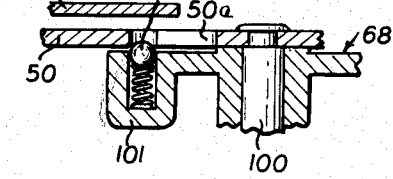

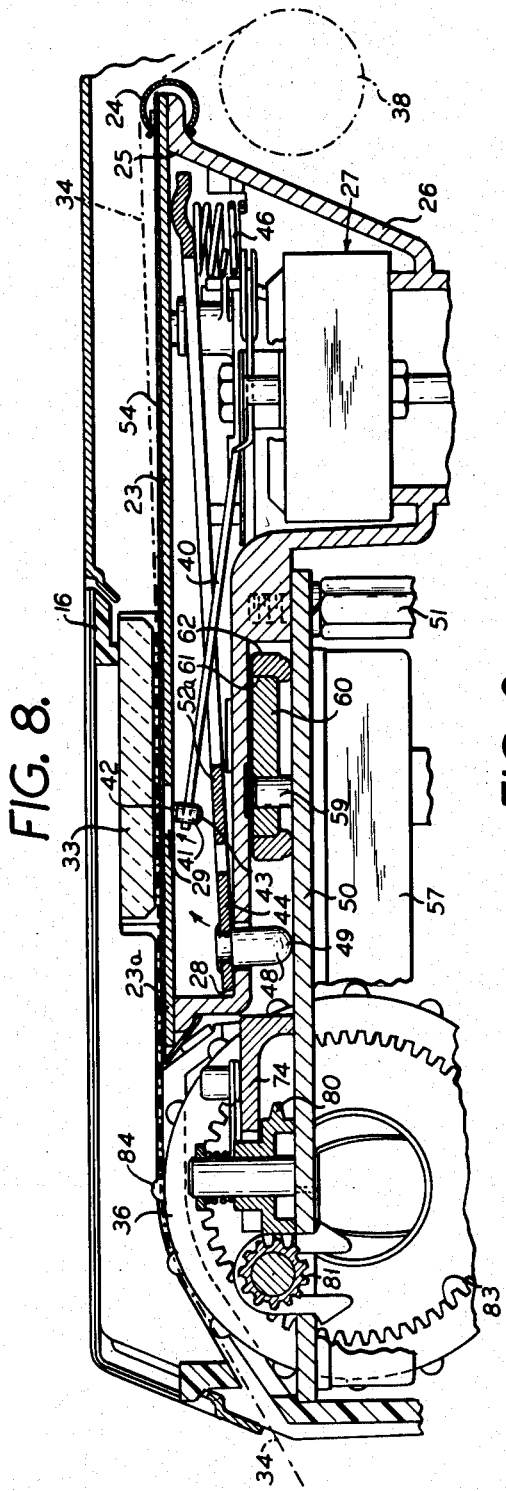
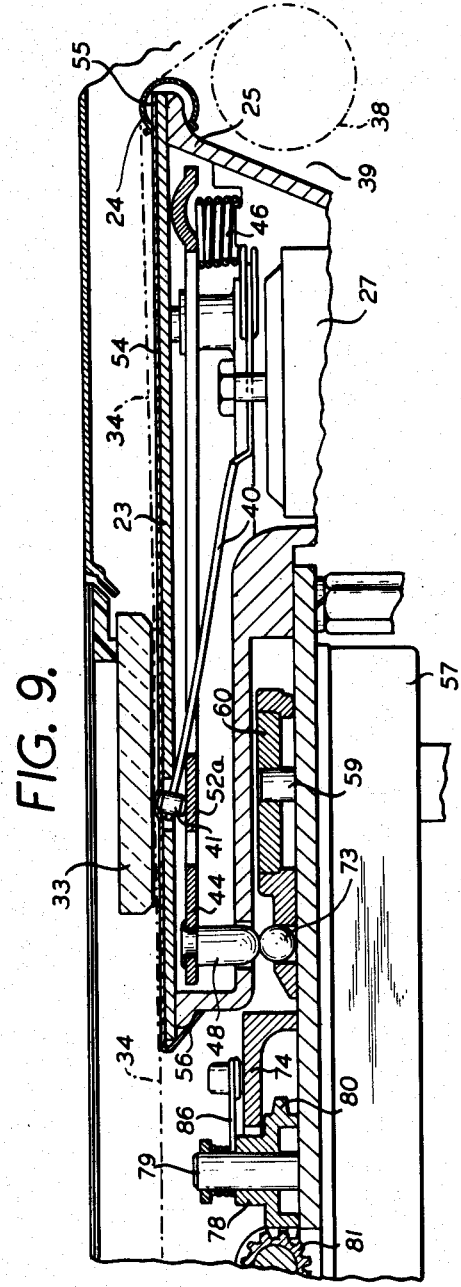
FIG. 8.
FIG. 9.
INVENTORS
SAMUEL J. KOCH
CHARLES EHRLICH
BY
ATTORNEY.

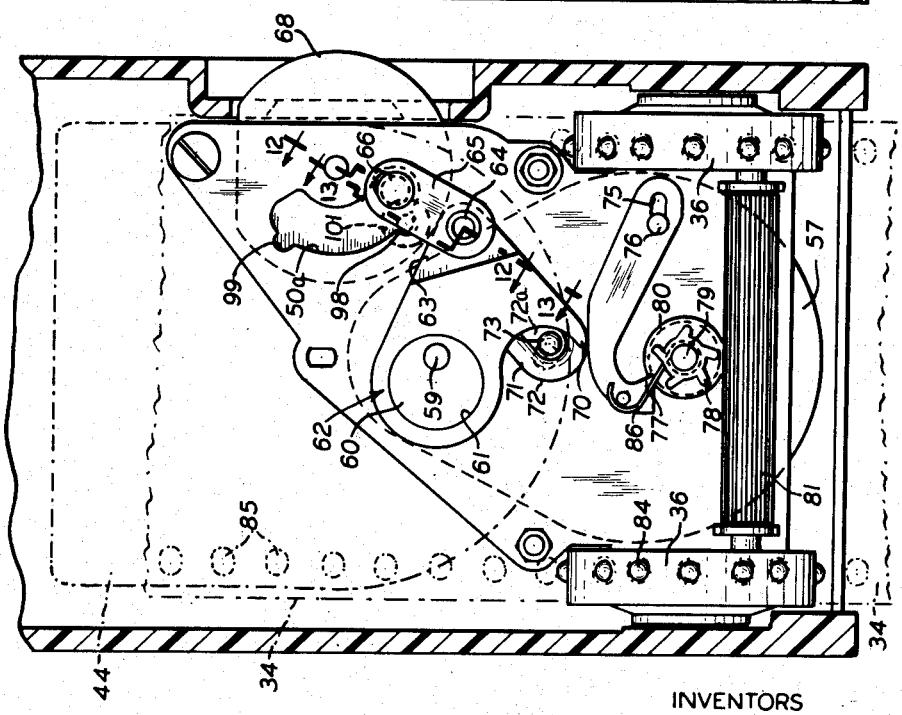
INVENTORS
SAMUEL J. KOCH
CHARLES EHRLICH
BY
ATTORNEY.

July 7, 1964  S. J. KOCH ETAL  3,140,144
ELECTRICAL MEASURING AND RECORDING INSTRUMENTS
Filed Nov. 14, 1961  6 Sheets-Sheet 6

INVENTORS
SAMUEL J. KOCH
CHARLES EHRLICH
BY
ATTORNEY.

United States Patent Office
3,140,144
Patented July 7, 1964

3,140,144
ELECTRICAL MEASURING AND RECORDING INSTRUMENTS

Samuel J. Koch, Great Neck, and Charles Ehrlich, New York, N.Y., assignors, by mesne assignments, to Amprobe Instrument Corporation, Lynbrook, N.Y., a corporation of New York
Filed Nov. 14, 1961, Ser. No. 152,186
15 Claims. (Cl. 346—17)

This invention relates to electrical measuring instruments, and is particularly directed to a combination electrical recording and indicating instrument.

Instruments for continuously recording variations in voltage, amperage, etc., employing a movable sheet on which a graph is produced by a stylus, are well-known devices; but they are basically independent units not adapted conveniently also to serve as an indicating meter. It is one of the important objectives of our invention to provide a compact unit adapted selectively to serve both purposes, to wit, either as a recording instrument or as an indicating instrument. In the accomplishment of this objective, we have provided a novel mechanism, actuated by motor means, whereby a recording sheet is intermittently fed in the path of a stylus connected to an indicating meter, the stylus being operatively actuated alternately with respect to the sheet feeding movements, so that stylus impressions are made during intervals between such movements. The arrangement is such that when the recording sheet is removed, the pointer of the indicating meter carrying the stylus and an adjacent scale becomes visible.

It is another object of our invention to provide manually operable means, readily accessible for easy manipulation, for retracting the stylus to its inoperative position and discontinuing the sheet-feeding action, thereby to permit the device to serve as an indicating instrument.

It is also an object of this invention to enable the recording sheet to be readily loaded and unloaded. The arrangement is such as to facilitate conversion of the device from a recording instrument to an indicating instument, and vice versa.

Still a further object of our invention is to provide means to seal the device against infiltration of dust during the loading and unloading of the recording sheet—the attainment of this objective constituting an important improvement over conventional recording devices wherein the internal mechanism is exposed to the atmosphere via apertures in the casing through which components of the recording instrument extend. In our device a flexible transparent sheet at all times operatively covers all apertures, without in any way interferring with the loading or unloading of the device, with the operation of the stylus or indicating pointer, or with the visibility of the pointer and scale markings when the device is used as an indicator.

Another object of our invention is to enable the device to be readily adapted for use to record or indicate electrical quanta of different ranges.

Other objectives, features and advantages will appear from the drawings and the description hereinafter given.

Referring to the drawings,

FIG. 4a is an enlarged fragmentary section of FIG. 4 taken along line 4a—4a.

FIG. 6 is an enlarged section of FIG. 1 taken substantially along line 6—6.

FIG. 7 is a fragmentary section of FIG. 6 taken substantially along line 7—7, showing electrical connections for the indicating meter and motor of the device, portions being removed for clarity.

FIG. 8 is an enlarged fragmentary section of FIG. 1 taken substantially along line 8—8, the recording stylus and lifting plate being shown in their respective inoperative positions.

FIG. 9 is a fragmentary view like FIG. 8, but showing the recording stylus and lifting plate in their respective operative positions.

FIG. 10 is a section substantially like FIG. 5, with certain portions removed and the sprocket wheels shown in elevation, the feeding pawl being shown in an intermediate position.

FIG. 11 is a view like FIG. 10, the feeding pawl being shown in its rearmost retracted position.

FIG. 12 is a fragmentary section of FIG. 10 taken along line 12—12.

FIG. 13 is a fragmentary section of FIG. 10 taken along line 13—13.

Figure 1:
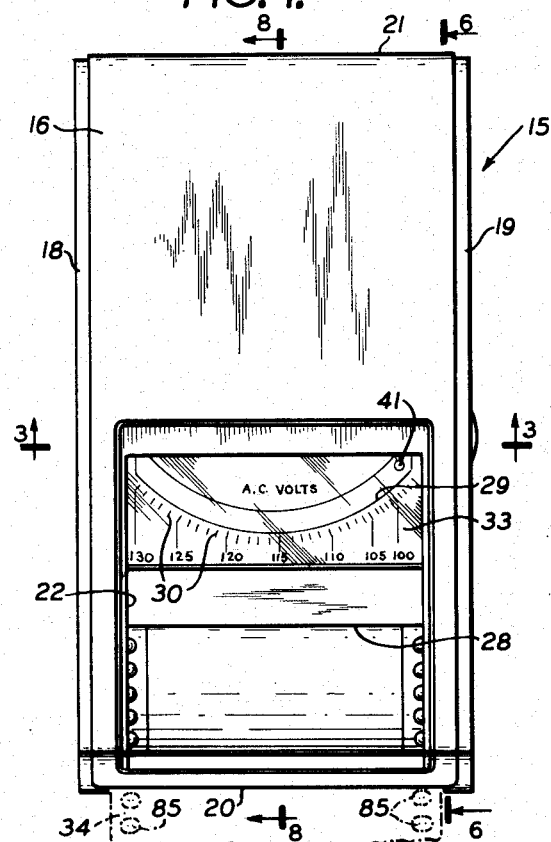
FIG. 1 is a front view of the electrical measuring and recording instrument of our invention, the dot dash lines showing an outwardly extending recording sheet.
Figure 2:
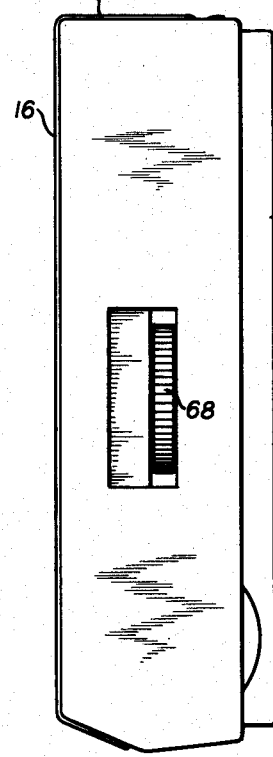
FIG. 2 is a side view thereof.
Figure 3:
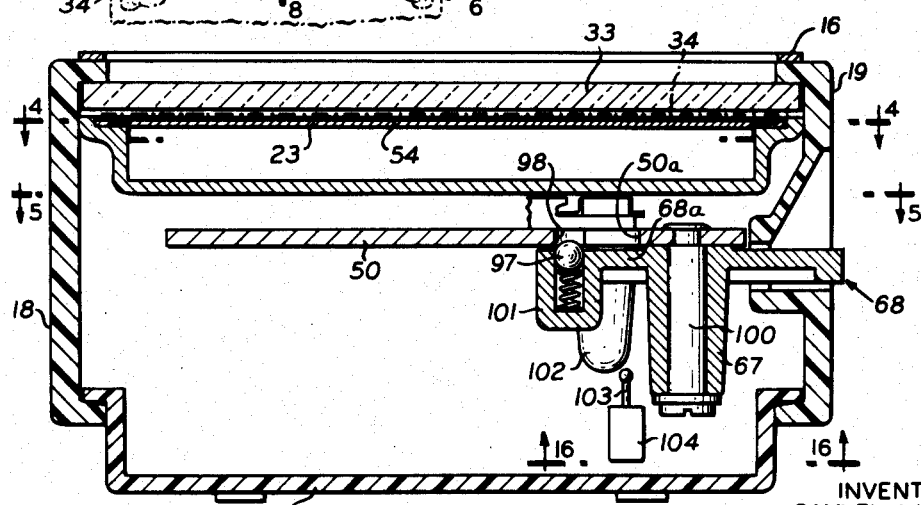
FIG. 3 is an enlarged section of FIG. 1 taken along line 3—3, with portions removed for clarity, the control knob being shown in the recording position of the instrument.
Figure 4:
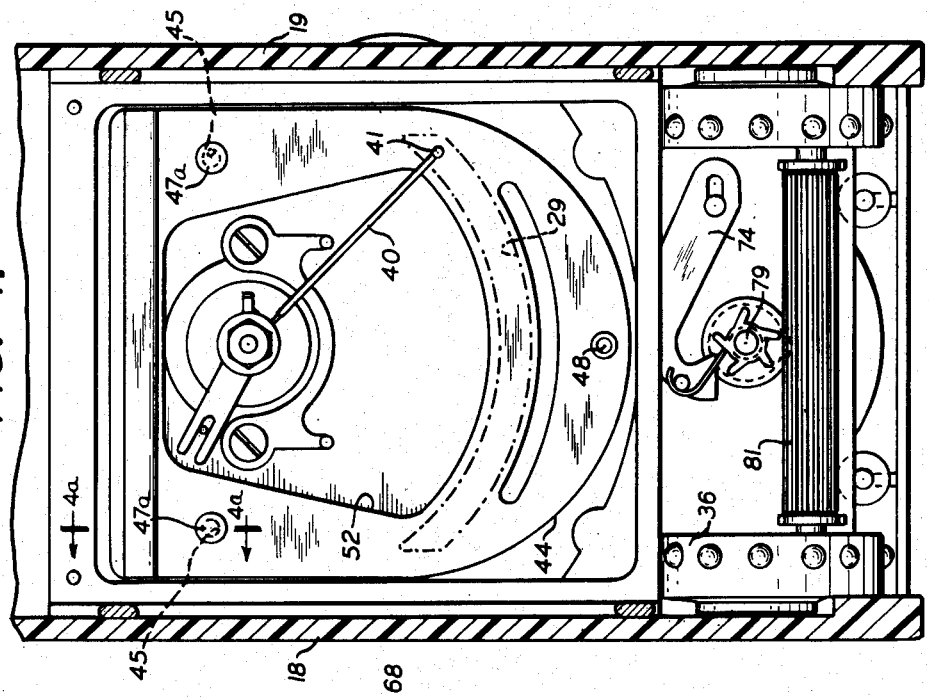
FIG. 4 is a fragmentary section of FIG. 3 taken along line 4—4.

In the particular form of our invention illustrated, both the recording and indicating mechanisms are enclosed within a casing generally designated 15 having a front wall 16, a back wall 17, side walls 18 and 19, bottom wall 20 and top wall 21. In the preferred embodiment shown, the side, back and bottom walls are of rigid plastic material, the front and top walls being of one-piece construction of thin somewhat resilient metal. Said front wall contains the apertured portion 22 at the lower part thereof to expose a recording sheet and, when said sheet is not used, an electrical indicating pointer and scale, as will more clearly appear from the description hereinbelow given. Behind said front wall 16 is the fixed plate 23 secured by a spring clip 24 to the wall 25 of the inner housing 26 containing the meter or electrical indicating mechanism generally designated 27—the lower edge 28 of said fixed plate 23 being in spaced relation to the said bottom wall 20 of the casing. Extending transversely across said fixed plate 23 is the arcuate slot 29, there being adjacent to one edge thereof a scale, such as the illustrated scale with voltage markings 30 thereon. Disposed between said side walls 18 and 19 is the transparent glass plate 33, the latter being supported in spaced relation to said fixed plate 23 so as to permit the positioning therebetween of an intermittently movable recording sheet 34 (represented by dot-dash lines) extending from the roll 38 disposed in compartment 39 at the upper part of the casing, the said sheet being adapted for mounting upon the laterally opposite sprocket wheels 36 in the lower compartment 37.

In the embodiment illustrated, the said indicating instrument 27 is a voltmeter; it is understood, however, that such instrument may be any other electrical measuring device, such as an ammeter, ohmmeter, or other meter for indicating other electrical quanta. Operatively connected to said indicating instrument 27, and attached in well-known manner for pivotal movement, is the indicating pointer 40 having at the terminal thereof the stylus 41, the upper portion 42 of the stylus extending through the said arcuate slot 29, the lower portion 43 of said stylus extending downwardly and being adapted to be engaged by the lift plate 44 to be hereinbelow described. The said meter 27 is electrically connected through a bank of leads 31 to a corresponding number of conductors generally designated 58a, the terminals of said conductors having pins 46b over adjacent pairs of which a socket may be attached for connection, through suitable conductors, to the circuit to be measured. The construction of said instrument 27 need not be herein described since it is well known to those skilled in the art. Suffice it to say for the purpose of this specification, that after a pair of adjacent terminal pins 46b have been selected, in accordance with the desired quantum range, and operatively connected, the pointer 40 will be actuated so that the terminal thereof containing the stylus 41 will move along an arcuate path along slot 29 adjacent said scale markings 30. If, for example, the said meter is a voltmeter, fluctuations in the voltage of a connected line will be reflected by different positions or the pointer 40. Hence, if there is no recording sheet 34 in the casing, the position of the stylus 41 could readily be seen through the glass plate 33, whereby the device serves as an indicator. When, however, the recording sheet 34 is in place, the said lift plate 44 is operatively actuated to engage the lower terminal 43 of the stylus 41 and raise the pointer 40 forwardly, thereby causing the upper terminal 42 of the stylus to produce an impression upon the sheet 34, the latter being of the well-known pressure-sensitive type adapted to show a spot where pressure is applied—all in a manner to be more clearly hereinbelow described.

Figure 4A:
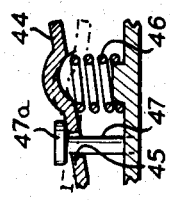

The said lift plate 44 is supported at laterally opposite upper pivot points, the spring means 46 engaging the underside of the upper portion of the lift plate to yieldably urge the lower operative portion thereof rearwardly. In the specific structure shown, the two apertured portions 45 are mounted over the pivot pins 47, the heads 47a of which limit the operative pivotal movements of the plate, as indicated in FIG. 4a. The lowermost portion of said lift plate has attached thereto the rearwardly extending lift pin 48, the bottom rounded portion 49 thereof normally being in resting engagement upon the base plate 50 fixedly maintained in place by fastener-spacers 51. The said lift plate 44 also contains therein at the upper portion thereof the apertured portion 52 to permit the pointer 40 to extend forwardly in a generally inclined direction from the meter 27 to its normal inoperative position spaced in front of the lift plate 44. The arrangement is hence such that the said lift plate does not interfere with the operative movement of the pointer along the arcuate slot 29. But when the lift plate 44 is operatively moved from its said normal inoperative position (FIG. 8) to its raised operative position (FIG. 9), the peripheral wall 52a defining the apertured portion 52 of the lift plate engages the lower end 43 of the stylus 41 to lift the pointer 40 to its upper operative position. In the preferred construction illustrated, the pointer 40 is made of thin resilient wire, whereby it bends or yields at juncture 53 to the pressure of the plate to enable the stylus to move to its said upper operative position.

It will be noted that overlying the fixed plate 23 is a cover 54 consisting of a sheet of flexible transparent material, said cover being secured at the upper edge 55 by clip 24, and having a return bend at 56 underlying the plate 23, the lateral sides of said flexible cover 54 being unattached. The recording sheet 34 overlies said flexible cover 54, the recording sheet 34 being disposed between said cover and the glass plate 33. The material of cover 54 is such as to permit the pressure of the stylus 41 to be transmitted therethrough to the recording sheet 34, the glass plate 33 serving as a backing to insure a clear dot at each upward movement of the stylus 41. It has been found that a material having the required properties for sheet 54 is a plastic material known by the trademark "Mylar," it being understood, however, that a sheet of other material having similar characteristics may be employed within the scope of this invention. The said cover 54, being transparent, does not interfere with the visibility of the markings on scale 30 or of the position of the stylus when the device is used as an indicator; it is sufficiently flexible and resilient to permit the stylus to transmit its impression, as aforesaid, upon the sheet 34 when it is operatively in place; and it is so positioned upon the fixed plate 23 as to completely cover the slot 29 and prevent the infiltration of dust during the operative loading or unloading of the recording sheet 34.

Rotatably mounted within the casing 15 is the motor mechanism generally designated 57, the said mechanism being electrically connected (in a manner well known to those skilled in the art) to two leads 32 connected to the two conductors 58 the terminals of which have pins 46a adapted to receive thereover a suitable socket plug connected by conductors to an electric wall outlet. The said motor mechanism 57 rotatably actuates the shaft 59 upon which is eccentrically mounted the cam 60, the latter being in rotatable engagement with the wall defining the cylindrical aperture 61 of the follower-actuator member generally designated 62. The lateral portion 63 of said actuator 62 carries the pin 64 which is pivotally connected to one end of the link 65, the opposite end of said link containing the apertured portion 64a in rotatable engagement with the pin 66 extending upwardly from the wall 68a of the disc-like knob 68 through the arcuate slotted portion 50a of plate 50, said wall 68a protruding outwardly from side wall 19 of the casing, for manual manipulation. Rotatably supported by and extending down from said plate 50 is the pin 100, said pin extending through and being in rotatable engagement with the hub 67 integral with said knob 68. Said knob 68 has on the underside thereof the socket 101 which supports the spring-loaded ball detent 97 engageable with the recesses 98 and 99 in plate 50 to limit, in known manner, the extreme operative positions of knob 68. The arrangement is such as to enable said rotatably mounted knob 68 to serve, in a manner to be hereinbelow described, as a means for moving said actuator 62 to and from its operative position.

Figure 14:
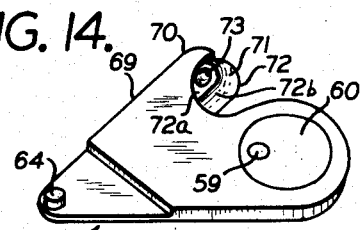
FIG. 14 is a perspective view of the follower-actuator member with the eccentrically mounted cam therein.

The actuator 62 (see FIGS. 10, 11, 14) contains two operative surfaces, to wit, the edge surface 69 the lowermost portion thereof being identified by the reference numeral 70, and the lateral surface 71 sloping upwardly from its bottom periphery 72 to the intermediate surface 72a, the ball 73, embedded in wall 72b, extending above said surface 72a. The arrangement is such that upon an operative rotation of shaft 59 and the said eccentrically mounted cam 60, the actuator 62 will be caused to rock about pin 64 as an axis; and since the link 65 is itself pivotally mounted on said pin 66, the said operative cam surface 69 and said inclined surface 71 are caused to move generally in an elliptical path during each operative rotation of shaft 59. As will more clearly hereinafter appear, the operative movement of said cam surfaces 69 and 71 are effective to cause alternate feeding movements of the sheet 34 and lifting movements of the lifting plate 44.

Disposed below and in adjacent relation to said operative surface 69 of actuator 62 is the ratchet pawl 74 having the slotted aperture 75 through which extends the pivot pin 76. The finger 77 of said pawl is operatively engageable with the teeth of the ratchet 78 mounted on shaft 79. In fixed relation to said ratchet 78 is the worm 80 in operative engagement with the worm gear 81 extending transversely across the device. The pinion gear teeth 82 at the opposite ends of said gear 81 are in engagement with the respective internal gears 83 of the two sprocket wheels 36—the latter containing sprockets 84 positioned for operative engagement with the respective laterally opposite holes 85 in the recording sheet 34. The spring 86, in operative engagement with the pawl 74, urges the latter upwardly, away from the ratchet 78. When the pin 66 of the knob 68 is in its operative position within the arcuate slot 50a and the shaft 59 is in its position indicated in FIG. 11, the pawl 74 is in its most retracted position. When said shaft 59 is in the position indicated in FIG. 10, the portion 70 of the actuator 62 is in engagement with said pawl, the latter having moved toward the ratchet 78 against the action of spring 86. When shaft 59 is in the position indicated in FIG. 5, the pawl is in its most advanced operative position, having actuated the ratchet 78 in a counterclockwise direction. Each such rotation of the ratchet 78 causes a corresponding rotation of the worm 80 and gear 81, the consequent rotation of the pinion gears 82 causing a corresponding rotation of the sprocket wheels 36 thereby causing a longitudinal operative movement of the recording sheet 34. It is thus evident that the coaction between the eccentric cam 60 and link 65 causes the actuator 62 to be rockingly actuated once during each operative cycle.

During the feeding action above described, the operative surface 71 of actuator 62 is spaced laterally from and out of engagement with the lift pin 48. But after the operative retraction of the cam surface 69 from the pawl 74, the continued operative rotation of cam 60 brings the lowermost edge 72 of surface 71 into engagement with the bottom rounded end 49 of said lift pin 48. The continued operative movement of actuator 62 causes said operative surface 71 to continue moving laterally under lift pin 48, whereupon the pin and the said lift plate 44 are moved upwardly. The high point of such movement occurs when the ball 73 is in underlying engagement with the lift pin 48, as shown in FIG. 9. At this point the stylus 41 is in operative engagement with the flexible cover 54, in the manner aforesaid. Upon a further continued rotation of cam 60, the ball 73 and cam surface 71 return to their inoperative positions out of engagement with the pin 48, whereupon the lift plate 44 is again caused to assume its lowered position under the action of the spring 46.

This cycle thus repeats itself with every rotation of cam 60, causing alternate feeding movements of the recording sheet 34 and dot impressions upon the said sheet. If the position of the pointer 40 varies, such as would be the case with fluctuating line voltages, the various positions would be reflected by the arrangement of dots. The path of a succession of such dots indicates the variations in line voltage.

Figure 5:
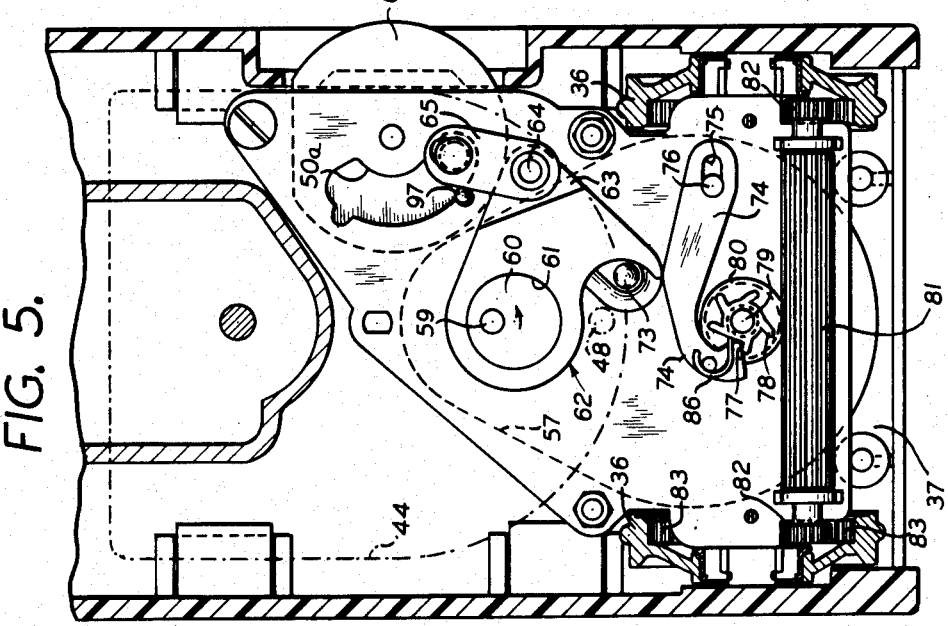
FIG. 5 is a fragmentary section of FIG. 3 taken substantially along line 5—5, the feeding pawl being shown in its advanced operative position.
Figure 15:
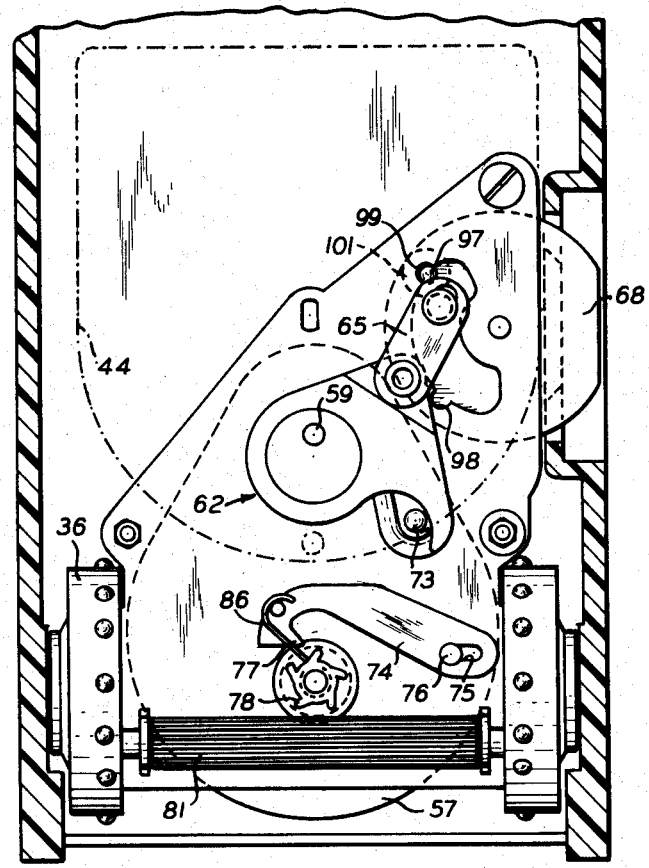
FIG. 15 is a view substantially like FIG. 11, but showing the position of the pawl and associated parts when the control knob is in its non-recording position.

Should it be desired to use this device as an indicating instrument, the recording sheet 34 is withdrawn from the casing, thereby leaving the arcuate slot 29 and scale markings 30 exposed to view. The control knob 68 is then rotated from the operative position such as is shown in FIGS. 5, 10 and 11, to the inoperative position shown in FIG. 15. Such rotary motion of the knob 68 causes the link 65 to move the actuator 62 away from the pawl 74 and lift pin 48, so that the actuator 62 can no longer impart a feeding motion to the pawl and a lifting motion to the lift pin 48.

Figure 16:
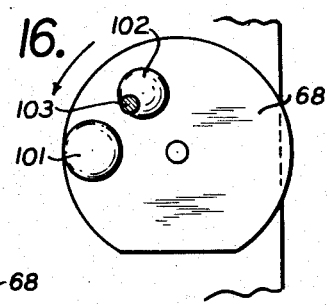
FIG. 16 is a fragmentary section of FIG. 3 taken along line 16—16, the motor control switch being schematically illustrated, the control knob being shown in its recording position.
Figure 17:
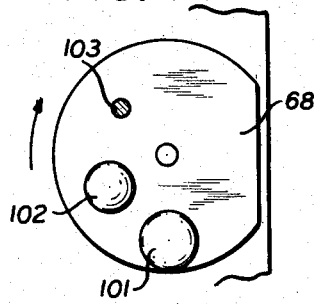
FIG. 17 is a view like FIG. 16, the control knob being shown in its non-recording position.

In the preferred construction illustrated, the rotation of the knob 68 between its operative position shown in FIG. 16 and its inoperative position shown in FIG. 17 causes the finger 102, on the underside of wall 68a of the knob, to engage and actuate the arm 103 of the switch member 104 electrically connected (by conductors not shown) to the motor 57. The arrangement is such that when the knob is moved from its operative to its inoperative position, the motor circuit is opened, and when the knob is moved in the opposite direction, the circuit is closed. The arrangement is hence such that the motor 57 will be in operation only when the recording mechanism of the device is in operation.

In the preferred form illustrated, the said front wall 16 and integral top wall 21 are removable from the casing 15, the rearmost portion of top wall 21 (which, as aforesaid, is somewhat resilient) having at the rear thereof the detent 95 yieldably disposed within the recesses 96 in the top edges of the side walls 18 and 19. The arrangement is hence such that when the said front wall 16 with the rearwardly extending top wall 21 are detached from the casing, the upper and lower compartments 39 and 37 are uncovered to permit easy loading and unloading.

It will be noted that when the device is employed as a recording instrument, the recording sheet 34 overlies the lowermost portion 23a of the fixed plate 23—said latter portion extending downwardly beyond the glass plate 33. The arrangement is such as to enable notes to be written on the recording sheet directly over said portion 23a, the latter serving as a backing to facilitate the writing.

In the above description, the invention has been disclosed merely by way of example and in preferred manner; but obviously many variations and modifications may be made therein. It is to be understood, therefore, that the invention is not limited to any form or manner of practicing same, except insofar as such limitations are specified in the appended claims.

We claim:

1. In an electrical measuring and recording instrument, an electrical meter having an indicating arm operatively movable in response to the energization of said meter, a stylus attached to said arm, a recording sheet, feeding means for moving said recording sheet along a predetermined path, a sheet of thin flexible material disposed between said stylus and said recording sheet, said indicating arm also being movable between a normal retracted position at which said stylus is in spaced relation to said path and an operative position at which said stylus is in pressing engagement with said flexible sheet, and actuating means for moving said arm between said positions, whereby operative impressions of the stylus may be transmitted through said flexible sheet to said recording sheet.

2. In an electrical measuring and recording instrument, an electrical meter having an indicating arm movable along a predetermined plane in response to the operative energization of said meter, a stylus attached to said arm, a recording sheet, feeding means for moving said recording sheet along a predetermined path in spaced relation to said plane, a sheet of thin flexible material disposed between said stylus and said recording sheet, said indicating arm also being movable in a direction in angular relation to said plane between a normal retracted position at which said stylus is in spaced relation to said path and an operative position at which said stylus is in pressing engagement with said flexible sheet, lifting means for moving said arm from its said normal retracted position to its said operative position, whereby when said arm is in its said operative position said stylus will make an impression on said recording sheet through said flexible sheet, an electric motor, and actuating means operatively connected to said motor and said lifting means.

3. In an electrical measuring and recording instrument, the combination according to claim 2, said lifting means comprising a pivotally mounted lift plate having an apertured portion therein, said indicating arm extending through said apertured portion from a point behind said plate forwardly to a position at which said stylus is in front of the plate, said actuating means having elevating means in engagement with said lifting plate, whereby upon an operative elevation of said plate the latter will engage and operatively move said stylus forwardly.

4. In an electrical measuring and recording instrument, the combination according to claim 2, said lifting means comprising a pivotally mounted lift plate disposed forwardly of said meter and having a free end movable between forward and rearward limiting positions, spring means normally urging said free end into its said rearward limiting position, said plate having an apertured portion therein, said indicating arm extending from said meter forwardly through said apertured portion, a stationary base plate in spaced relation to said lift plate, said lift plate having a lift pin attached thereto and in engagement with said base plate when the free end of said lift plate is in its said rearward limiting position, said actuating means having cam means operatively mounted on said base plate and engageable with said lift pin for moving said lift plate against the action of said spring means to its said forward limiting position, whereby said lift plate will engage and operatively move said stylus forwardly.

5. In an electrical measuring and recording instrument, an electrical meter having an indicating arm movable along a predetermined plane in response to the operative energization of said meter, a stylus attached to said arm, feeding means for intermittently moving a recording sheet along a predetermined path, said indicating arm also being movable between a normal retracted position at which said stylus is in spaced relation to said path and an operative position at which said stylus is in intersecting relation thereto, and a lifting member for intermittently moving said arm from its said normal retracted position to its said operative position, whereby when said arm is in its said operative position said stylus will make an impression on a recording sheet operatively disposed along said path, said feeding means comprising rotary means positioned for operative feeding engagement with an operatively positioned recording sheet, a ratchet wheel coactively connected to said rotary means, a pivotally mounted pawl positioned for operative engagement with said ratchet wheel, spring means normally urging said pawl out of engagement with said ratchet wheel, an electric motor, an actuator member operatively connected to said motor and having a cam surface thereon engageable with said pawl for moving it into operative engagement with said ratchet wheel against the action of said spring means, said actuator member also having a cam wall operatively engageable with said lifting member, said cam surface and cam wall being so proportioned and positioned that they will alternately operatively actuate said pawl and lifting member, respectively.

6. In an electrical measuring and recording instrument, the combination according to claim 5, said actuator member being eccentrically connected to said motor, to impart predetermined cyclic operative movements to said cam surface and cam wall.

7. In an electrical measuring and recording instrument, the combination according to claim 5, said actuator member having a peripheral edge a portion thereof constituting said cam surface engageable with said pawl, and also having an inclined surface constituting said cam wall engageable with said lifting member, said motor having a shaft and a disc cam eccentrically mounted on the shaft, said actuator member having a cylindrical follower wall in rotatable peripheral engagement with said disc cam.

8. In an electrical measuring and recording instrument, the combination according to claim 5, said actuator member having a peripheral edge a portion thereof constituting said cam surface engageable with said pawl, said actuator member also having a base surface, an intermediate surface and an inclined surface extending between said base and intermediate surfaces, said inclined surface constituting said cam wall, a ball member on said intermediate surface, said inclined surface and said ball member being operatively engageable with said lifting member, said motor having a shaft, and a disc cam eccentrically mounted on the shaft, said actuator member having a cylindrical follower wall in rotatable peripheral engagement with said disc cam.

9. In an electrical measuring and recording instrument, the combination according to claim 5, said actuator member being eccentrically connected to said motor, a link having one end pivotally connected to said actuator member at a point remote from the latter's said eccentric connection to said motor, and a stationary pivotal support, the other end of said link being pivotally connected to said stationary support.

10. In an electrical measuring and recording instrument, the combination according to claim 5, said actuator member being eccentrically connected to said motor, a link having one end pivotally connected to said actuator member at a point remote from the latter's said eccentric connection to said motor, and a stationary pivotal support, the other end of said link being pivotally connected to said stationary support, said stationary support being movable between two limiting positions, said actuator member, pawl and link being so positioned and proportioned that at one of said limiting positions said cam surface on the actuator member is engageable with said pawl, and at the other of said limiting positions said cam surface is not engageable with said pawl.

11. In an electrical measuring and recording instrument, the combination according to claim 5, said actuator member being eccentrically connected to said motor, a link having one end pivotally connected to said actuator member at a point remote from the latter's said eccentric connection to said motor, a stationary pivotal support, the other end of said link being pivotally connected to said stationary support, said stationary support being movable between two limiting positions, said actuator member, pawl and link being so positioned and proportioned that at one of said limiting positions said cam surface on the actuator member is engageable with said pawl, and at the other of said limiting positions said cam surface is not engageable with said pawl, and a control knob carrying said stationary support and manually manipulable for moving said support between its said two limiting positions.

12. In an electrical measuring and recording instrument, an electrical meter having an indicating arm movable along a predetermined plane in response to the operative energization of said meter, a stylus attached to said arm, feeding means for moving a recording sheet along a predetermined path, said indicating arm also being movable in a direction in angular relation to said plane between a normal retracted position at which said stylus is in spaced relation to said path and an operative position at which said stylus is in intersecting relation thereto, lifting means for moving said arm from its said normal retracted position to its operative position, whereby when said arm is in its said operative position said stylus will make an impression on a recording sheet operatively disposed along said path, said lifting means comprising a pivotally mounted lift plate having an apertured portion therein, said indicating arm extending through said apertured portion from a point behind said plate forwardly to a position at which said stylus is in front of the plate, said actuating means having elevating means in engagement with said lifting plate, whereby upon an operative elevation of said plate the latter will engage and operatively move said stylus forwardly, a fixed plate positioned behind and in adjacent parallel relation to the operative path of said recording sheet, said fixed plate having an aperture therein in registry with the operative path of movement of the stylus along its said predetermined plane, said aperture being proportioned and positioned to permit the stylus to extend therethrough when in its said operative position, a sheet of thin flexible transparent material disposed upon the outer face of said fixed plate, and a plate of rigid transparent material disposed in front of and in adjacent spaced relation to said thin sheet and in overlying relation to the apertured portion of said fixed plate, whereby operative impressions of the stylus may be transmitted through said flexible material to a sheet of recording paper operatively positioned thereover against said plate of rigid material as a backing.

13. In an electrical measuring and recording instrument, an electrical meter having an indicating arm movable along a predetermined plane in response to the operative energization of said meter, a stylus attached to said arm, feeding means for moving a recording sheet along a predetermined path, said indicating arm also being movable in a direction in angular relation to said plane between a normal retracted position at which said stylus is in spaced relation to said path and an operative position at which said stylus is in intersecting relation thereto, lifting means for moving said arm from its said normal retracted position to its operative position, whereby when said arm is in its said operative position said stylus will make an impression on a recording sheet operatively disposed along said path, said lifting means comprising a pivotally mounted lift plate having an apertured portion therein, said indicating arm extending through said apertured portion from a point behind said plate forwardly to a position at which said stylus is in front of the plate, said actuating means having elevating means in engagement with said lifting plate, whereby upon an operative elevation of said plate the latter will engage and operatively move said stylus forwardly, a fixed plate positioned behind and in adjacent parallel relation to the operative path of said recording sheet, said fixed plate having an aperture therein in registry with the operative path of movement of the stylus along its said predetermined plane, said aperture being proportioned and positioned to permit the stylus to extend therethrough when in its said operative position, a sheet of thin flexible transparent material disposed upon the outer face of said fixed plate and extending substantially from the top to the bottom thereof, and means to hold said sheet at its upper and lower edges, the sides of said flexible sheet being unattached.

14. In an electrical recording instrument, feeding means for moving a recording sheet along a predetermined path, a stylus, a sheet of thin flexible material disposed between said stylus and said recording sheet path, said stylus being movable between a normally retracted position at which it is in spaced relation to said recording sheet path and an operative position at which said stylus is in pressing engagement with said flexible sheet, and actuating means for moving said stylus between said positions, said actuating means being movably responsive to electrical energization, whereby operative impressions of the stylus may be transmitted through said flexible sheet to a sheet of recording paper operatively disposed along said path.

15. In an electrical recording instrument, a recording sheet, a stylus, a sheet of thin flexible material disposed between said stylus and said recording sheet, said stylus being movable between a normally retracted position at which it is in spaced relation to said recording sheet and an operative position at which said stylus is in pressing engagement with said flexible sheet, actuating means for moving said stylus between said positions, said actuating means being movably responsive to electrical energization, and a casing housing said actuating means and having a wall with an apertured portion through which said stylus extends when in its said operative position, said flexible sheet being disposed over and in sealing relation to said apertured portion, whereby operative impressions of the stylus may be transmitted through said flexible sheet to said recording sheet.

References Cited in the file of this patent
UNITED STATES PATENTS

| | | |
|---|---|---|
| 1,124,820 | Simonsson | Jan. 12, 1915 |
| 1,724,833 | Faus | Aug. 13, 1929 |
| 2,267,465 | Jakosky | Dec. 23, 1941 |
| 2,526,329 | Chamberlain | Oct. 17, 1950 |
| 3,034,056 | Terry | May 8, 1962 |